(12) United States Patent
Natanzon et al.

(10) Patent No.: US 9,223,659 B1
(45) Date of Patent: Dec. 29, 2015

(54) GENERATING AND ACCESSING A VIRTUAL VOLUME SNAPSHOT IN A CONTINUOUS DATA PROTECTION SYSTEM

(75) Inventors: Assaf Natanzon, Tel Aviv (IL); Saar Cohen, Moshav Mishmeret (IL)

(73) Assignee: EMC International Company, Hamilton (BM)

( * ) Notice: Subject to any disclaimer, the term of this patent is extended or adjusted under 35 U.S.C. 154(b) by 136 days.

(21) Appl. No.: 13/535,846

(22) Filed: Jun. 28, 2012

(51) Int. Cl.
  *G06F 12/00* (2006.01)
  *G06F 11/14* (2006.01)

(52) U.S. Cl.
  CPC .................. *G06F 11/1446* (2013.01)

(58) Field of Classification Search
  None
  See application file for complete search history.

(56) References Cited

U.S. PATENT DOCUMENTS

| | | | |
|---|---|---|---|
| 5,170,480 A | 12/1992 | Mohan et al. | |
| 5,249,053 A | 9/1993 | Jain | |
| 5,388,254 A | 2/1995 | Betz et al. | |
| 5,499,367 A | 3/1996 | Bamford et al. | |
| 5,526,397 A | 6/1996 | Lohman | |
| 5,864,837 A | 1/1999 | Maimone | |
| 5,879,459 A | 3/1999 | Gadgil et al. | |
| 5,990,899 A | 11/1999 | Whitten | |
| 6,042,652 A | 3/2000 | Hyun et al. | |
| 6,065,018 A | 5/2000 | Beier et al. | |
| 6,143,659 A | 11/2000 | Leem | |
| 6,148,340 A | 11/2000 | Bittinger et al. | |
| 6,174,377 B1 | 1/2001 | Doering et al. | |
| 6,174,809 B1 | 1/2001 | Kang et al. | |
| 6,203,613 B1 | 3/2001 | Gates et al. | |
| 6,260,125 B1 | 7/2001 | McDowell | |
| 6,270,572 B1 | 8/2001 | Kim et al. | |
| 6,272,534 B1 | 8/2001 | Guha | |
| 6,287,965 B1 | 9/2001 | Kang et al. | |
| 6,467,023 B1 | 10/2002 | DeKoning et al. | |
| 6,574,657 B1 | 6/2003 | Dickinson | |
| 6,621,493 B1 | 9/2003 | Whitten | |
| 6,804,676 B1 | 10/2004 | Bains, II | |
| 6,889,228 B1 * | 5/2005 | Federwisch | |
| 6,947,981 B2 | 9/2005 | Lubbers et al. | |
| 7,043,610 B2 | 5/2006 | Horn et al. | |
| 7,051,126 B1 | 5/2006 | Franklin | |
| 7,076,620 B2 | 7/2006 | Takeda et al. | |
| 7,100,089 B1 * | 8/2006 | Phelps | 714/42 |
| 7,111,197 B2 | 9/2006 | Kingsbury et al. | |
| 7,117,327 B2 | 10/2006 | Hirakawa et al. | |
| 7,120,768 B2 | 10/2006 | Mizuno et al. | |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Gibson, "Five Point Plan Lies at the Heart of Compression Technology;" Apr. 29, 1991; p. 1.

(Continued)

*Primary Examiner* — Yaima Rigol
*Assistant Examiner* — Tasnima Matin
(74) *Attorney, Agent, or Firm* — Daly, Crowley, Mofford & Durkee, LLP (57) ABSTRACT

In one aspect, a method includes receiving a request to access a virtual volume snapshot, preparing to bind the virtual volume snapshot, intercepting a command to prepare bind of the virtual volume snapshot, rolling back to a point in time corresponding to the requested virtual volume snapshot and generating a virtual volume snapshot in a storage array.

20 Claims, 7 Drawing Sheets

(56) References Cited

U.S. PATENT DOCUMENTS

| | | | |
|---|---|---|---|
| 7,130,975 B2 | 10/2006 | Suishu et al. | |
| 7,139,927 B2 | 11/2006 | Park et al. | |
| 7,159,088 B2 | 1/2007 | Hirakawa et al. | |
| 7,167,963 B2 | 1/2007 | Hirakawa et al. | |
| 7,203,741 B2 | 4/2007 | Marco et al. | |
| 7,222,136 B1 | 5/2007 | Brown et al. | |
| 7,296,008 B2 | 11/2007 | Passerini et al. | |
| 7,328,373 B2 | 2/2008 | Kawamura et al. | |
| 7,353,335 B2 | 4/2008 | Kawamura | |
| 7,360,113 B2 | 4/2008 | Anderson et al. | |
| 7,426,618 B2 | 9/2008 | Vu et al. | |
| 7,516,287 B2 | 4/2009 | Ahal et al. | |
| 7,519,625 B2 | 4/2009 | Honami et al. | |
| 7,519,628 B1 | 4/2009 | Leverett | |
| 7,546,485 B2 | 6/2009 | Cochran et al. | |
| 7,577,867 B2 | 8/2009 | Lewin et al. | |
| 7,590,887 B2 | 9/2009 | Kano | |
| 7,606,940 B2 | 10/2009 | Yamagami | |
| 7,627,612 B2 | 12/2009 | Ahal et al. | |
| 7,627,687 B2 | 12/2009 | Ahal et al. | |
| 7,719,443 B1 | 5/2010 | Natanzon | |
| 7,757,057 B2 | 7/2010 | Sangapu et al. | |
| 7,774,565 B2 | 8/2010 | Lewin et al. | |
| 7,797,358 B1 | 9/2010 | Ahal et al. | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,849,361 B2 | 12/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,205,009 B2 | 6/2012 | Heller et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,312,231 B1 * | 11/2012 | Li et al. | 711/154 |
| 8,332,687 B1 | 12/2012 | Natanzon et al. | |
| 8,335,761 B1 | 12/2012 | Natanzon | |
| 8,335,771 B1 * | 12/2012 | Natanzon et al. | 707/684 |
| 8,341,115 B1 | 12/2012 | Natanzon et al. | |
| 8,370,648 B1 | 2/2013 | Natanzon | |
| 8,380,885 B1 | 2/2013 | Natanzon | |
| 8,392,680 B1 | 3/2013 | Natanzon et al. | |
| 8,429,362 B1 | 4/2013 | Natanzon et al. | |
| 8,433,869 B1 | 4/2013 | Natanzon et al. | |
| 8,438,135 B1 | 5/2013 | Natanzon et al. | |
| 8,464,101 B1 | 6/2013 | Natanzon et al. | |
| 8,478,955 B1 | 7/2013 | Natanzon et al. | |
| 8,495,304 B1 | 7/2013 | Natanzon et al. | |
| 8,510,279 B1 | 8/2013 | Natanzon et al. | |
| 8,521,691 B1 | 8/2013 | Natanzon | |
| 8,521,694 B1 | 8/2013 | Natanzon | |
| 8,543,609 B1 | 9/2013 | Natanzon | |
| 8,583,885 B1 | 11/2013 | Natanzon | |
| 8,600,945 B1 | 12/2013 | Natanzon et al. | |
| 8,601,085 B1 | 12/2013 | Ives et al. | |
| 8,627,012 B1 | 1/2014 | Derbeko et al. | |
| 8,683,592 B1 | 3/2014 | Dotan et al. | |
| 8,694,700 B1 | 4/2014 | Natanzon et al. | |
| 8,706,700 B1 | 4/2014 | Natanzon et al. | |
| 8,712,962 B1 | 4/2014 | Natanzon et al. | |
| 8,719,497 B1 | 5/2014 | Don et al. | |
| 8,725,691 B1 | 5/2014 | Natanzon | |
| 8,725,692 B1 | 5/2014 | Natanzon et al. | |
| 8,726,066 B1 | 5/2014 | Natanzon et al. | |
| 8,738,813 B1 | 5/2014 | Natanzon et al. | |
| 8,745,004 B1 | 6/2014 | Natanzon et al. | |
| 8,751,828 B1 | 6/2014 | Raizen et al. | |
| 8,769,336 B1 | 7/2014 | Natanzon et al. | |
| 8,805,786 B1 | 8/2014 | Natanzon | |
| 8,806,161 B1 | 8/2014 | Natanzon | |
| 8,825,848 B1 | 9/2014 | Dotan et al. | |
| 8,832,399 B1 | 9/2014 | Natanzon et al. | |
| 8,850,143 B1 | 9/2014 | Natanzon | |
| 8,850,144 B1 | 9/2014 | Natanzon et al. | |
| 8,862,546 B1 | 10/2014 | Natanzon et al. | |
| 8,892,835 B1 | 11/2014 | Natanzon et al. | |
| 8,898,112 B1 | 11/2014 | Natanzon et al. | |
| 8,898,409 B1 | 11/2014 | Natanzon et al. | |
| 8,898,515 B1 | 11/2014 | Natanzon | |
| 8,898,519 B1 | 11/2014 | Natanzon et al. | |
| 8,914,595 B1 | 12/2014 | Natanzon | |
| 8,924,668 B1 | 12/2014 | Natanzon | |
| 8,930,500 B2 | 1/2015 | Marco et al. | |
| 8,930,947 B1 | 1/2015 | Derbeko et al. | |
| 8,935,498 B1 | 1/2015 | Natanzon | |
| 8,949,180 B1 | 2/2015 | Natanzon et al. | |
| 8,954,673 B1 | 2/2015 | Natanzon et al. | |
| 8,954,796 B1 | 2/2015 | Cohen et al. | |
| 8,959,054 B1 | 2/2015 | Natanzon | |
| 8,977,593 B1 | 3/2015 | Natanzon et al. | |
| 8,977,826 B1 | 3/2015 | Meiri et al. | |
| 8,996,460 B1 | 3/2015 | Frank et al. | |
| 8,996,461 B1 | 3/2015 | Natanzon et al. | |
| 8,996,827 B1 | 3/2015 | Natanzon | |
| 9,003,138 B1 | 4/2015 | Natanzon et al. | |
| 9,026,696 B1 | 5/2015 | Natanzon et al. | |
| 9,031,913 B1 | 5/2015 | Natanzon | |
| 9,032,160 B1 | 5/2015 | Natanzon et al. | |
| 9,037,818 B1 | 5/2015 | Natanzon et al. | |
| 9,063,994 B1 | 6/2015 | Natanzon et al. | |
| 9,069,479 B1 | 6/2015 | Natanzon | |
| 9,069,709 B1 | 6/2015 | Natanzon et al. | |
| 9,081,754 B1 | 7/2015 | Natanzon et al. | |
| 9,081,842 B1 | 7/2015 | Natanzon et al. | |
| 9,087,008 B1 | 7/2015 | Natanzon | |
| 9,087,112 B1 | 7/2015 | Natanzon et al. | |
| 9,104,529 B1 | 8/2015 | Derbeko et al. | |
| 9,110,914 B1 | 8/2015 | Frank et al. | |
| 9,116,811 B1 | 8/2015 | Derbeko et al. | |
| 9,128,628 B1 | 9/2015 | Natanzon et al. | |
| 9,128,855 B1 | 9/2015 | Natanzon et al. | |
| 9,134,914 B1 | 9/2015 | Derbeko et al. | |
| 9,135,119 B1 | 9/2015 | Natanzon et al. | |
| 9,135,120 B1 | 9/2015 | Natanzon | |
| 2002/0129168 A1 | 9/2002 | Kanai et al. | |
| 2003/0048842 A1 | 3/2003 | Fourquin et al. | |
| 2003/0061537 A1 | 3/2003 | Cha et al. | |
| 2003/0110278 A1 | 6/2003 | Anderson | |
| 2003/0131207 A1 * | 7/2003 | Arakawa et al. | 711/162 |
| 2003/0145317 A1 | 7/2003 | Chamberlain | |
| 2003/0182313 A1 * | 9/2003 | Federwisch et al. | 707/200 |
| 2003/0196147 A1 | 10/2003 | Hirata et al. | |
| 2004/0205092 A1 | 10/2004 | Longo et al. | |
| 2004/0250032 A1 | 12/2004 | Ji et al. | |
| 2004/0254964 A1 | 12/2004 | Kodama et al. | |
| 2005/0015663 A1 | 1/2005 | Armangau et al. | |
| 2005/0028022 A1 | 2/2005 | Amano | |
| 2005/0049924 A1 | 3/2005 | DeBettencourt et al. | |
| 2005/0172092 A1 | 8/2005 | Lam et al. | |
| 2005/0273655 A1 | 12/2005 | Chow et al. | |
| 2006/0031647 A1 | 2/2006 | Hirakawa et al. | |
| 2006/0047996 A1 | 3/2006 | Anderson et al. | |
| 2006/0053139 A1 * | 3/2006 | Marzinski et al. | 707/101 |
| 2006/0064416 A1 | 3/2006 | Sim-Tang | |
| 2006/0107007 A1 | 5/2006 | Hirakawa et al. | |
| 2006/0117211 A1 | 6/2006 | Matsunami et al. | |
| 2006/0161810 A1 | 7/2006 | Bao | |
| 2006/0179343 A1 | 8/2006 | Kitamura | |
| 2006/0195670 A1 | 8/2006 | Iwamura et al. | |
| 2006/0212462 A1 | 9/2006 | Heller et al. | |
| 2007/0055833 A1 * | 3/2007 | Vu et al. | 711/162 |
| 2007/0162513 A1 * | 7/2007 | Lewin et al. | 707/200 |
| 2007/0180304 A1 | 8/2007 | Kano | |
| 2007/0198602 A1 | 8/2007 | Ngo et al. | |
| 2007/0198791 A1 | 8/2007 | Iwamura et al. | |

(56) References Cited

U.S. PATENT DOCUMENTS

| | | | |
|---|---|---|---|
| 2007/0220311 A1 | 9/2007 | Lewin et al. | |
| 2007/0266053 A1 | 11/2007 | Ahal et al. | |
| 2008/0082591 A1 | 4/2008 | Ahal et al. | |
| 2008/0082592 A1 | 4/2008 | Ahal et al. | |
| 2008/0082770 A1* | 4/2008 | Ahal et al. | 711/162 |
| 2008/0177957 A1* | 7/2008 | Lee | 711/161 |
| 2009/0044046 A1* | 2/2009 | Yamasaki | 714/6 |
| 2009/0313503 A1* | 12/2009 | Atluri et al. | 714/19 |
| 2010/0077165 A1* | 3/2010 | Lu et al. | 711/162 |

OTHER PUBLICATIONS

Soules, "Metadata Efficiency in Versioning File Systems:" 2003; pp. 1-16.

AIX System Management Concepts: Operating Systems and Devices; May 2000; pp. 1-280.

Soules et al.; "Metadata Efficiency in a Comprehensive Versioning File System;" May 2002; CMU-CS-02-145; School of Computer Science, Carneige Mellon University, Pittsburgh, PA 15213; 33 pages.

Linux Filesystems; Sams Publishing; 2002; pp. 17-22 and 67-71.

Bunyan, "Multiplexing in a BrightStor® ARCserve® Backup Release 11;" Mar. 2004; pp. 1-4.

Marks, "Network Computing;" Feb. 2, 2006; pp. 1-8.

Hill, "Network Computing;" Jun. 8, 2006; pp. 1-9.

Microsoft Computer Dictionary; 2002; Press Fifth Edition; 2 pages.

Retrieved from http://en.wikipedia.org/wiki/DEFLATE; DEFLATE; Jun. 19, 2008; pp. 1-6.

Retrieved from http://en.wikipedia.org/wiki/Huffman_coding: Huffman Coding; Jun. 8, 2008; pp. 1-11.

Retrieved from http:///en.wikipedia.org/wiki/LZ77; LZ77 and LZ78; Jun. 17, 2008; pp. 1-2.

U.S. Appl. No. 11/609,560.
U.S. Appl. No. 12/057,652.
U.S. Appl. No. 11/609,561.
U.S. Appl. No. 11/356,920.
U.S. Appl. No. 10/512,687.
U.S. Appl. No. 11/536,233.
U.S. Appl. No. 11/536,215.
U.S. Appl. No. 11/536,160.
U.S. Appl. No. 11/964,168.

* cited by examiner

GENERATING AND ACCESSING A VIRTUAL VOLUME SNAPSHOT IN A CONTINUOUS DATA PROTECTION SYSTEM

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes receiving a request to access a virtual volume snapshot, preparing to bind the virtual volume snapshot, intercepting a command to prepare bind of the virtual volume snapshot, rolling back to a point in time corresponding to the requested virtual volume snapshot and generating a virtual volume snapshot in a storage array.

In another aspect, an article includes a non-transitory machine-readable medium that stores executable instructions. The instructions cause a machine to receive a request to access a virtual volume snapshot, prepare to bind the virtual volume snapshot, intercept a command to prepare bind of the virtual volume snapshot, roll back to a point in time corresponding to the requested virtual volume snapshot and generate a virtual volume snapshot in a storage array.

In a further aspect, an apparatus circuitry configured to receive a request to access a virtual volume snapshot, prepare to bind the virtual volume snapshot, intercept a command to prepare bind of the virtual volume snapshot, roll back to a point in time corresponding to the requested virtual volume snapshot and generate a virtual volume snapshot in a storage array.

DETAILED DESCRIPTION

Virtual volumes are a new storage abstraction to store virtual machines (VM). Virtual volumes allow for millions of snapshots to be generated. Described herein are techniques to allow a user to generate snapshots and to allow the user to access those snapshots that the user wants to access.

The following definitions may be useful in understanding the specification and claims.

BACKUP SITE—a facility where replicated production site data is stored; the backup site may be located in a remote site or at the same location as the production site;

DATA PROTECTION APPLIANCE (DPA)—a computer or a cluster of computers responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request which may be a read I/O request (read request) or a write I/O request (write request), also referred to as an I/O;

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal)

SPLITTER ACKNOWLEDGEMENT—an acknowledgement from a DPA to the protection agent that data has been received at the DPA; this may be achieved by SCSI status cmd.

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

VIRTUAL LOGICAL UNIT—a virtual storage entity which is treated as a logical unit by virtual machines;

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

An Example of a Replication System

Figure 1:
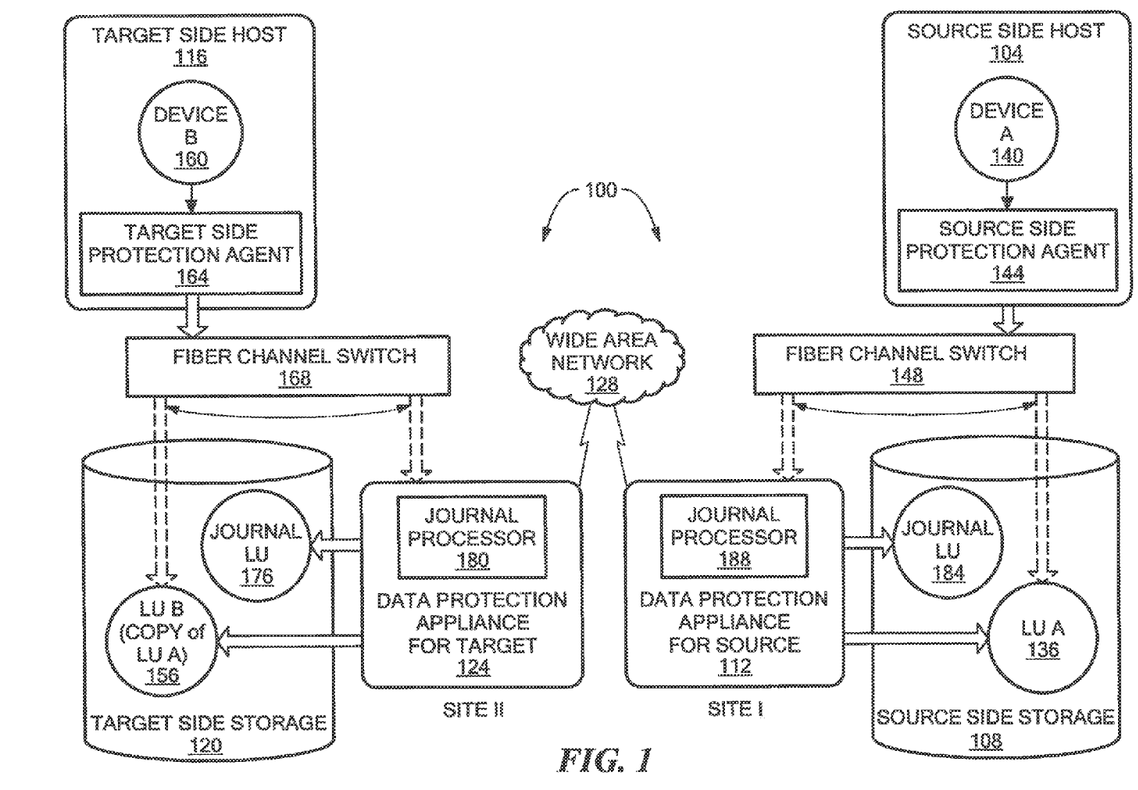
FIG. 1 is a block diagram of an example of a data protection system.

Referring to FIG. 1, a data protection system 100 includes two sites; Site I, which is a production site, and Site II, which is a backup site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS creates files in the file system and expose the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B, updates the journal entries in the journal LU with undo information, applies the journal transactions to LU B, and removes already-applied transactions from the journal.

Figure 2:
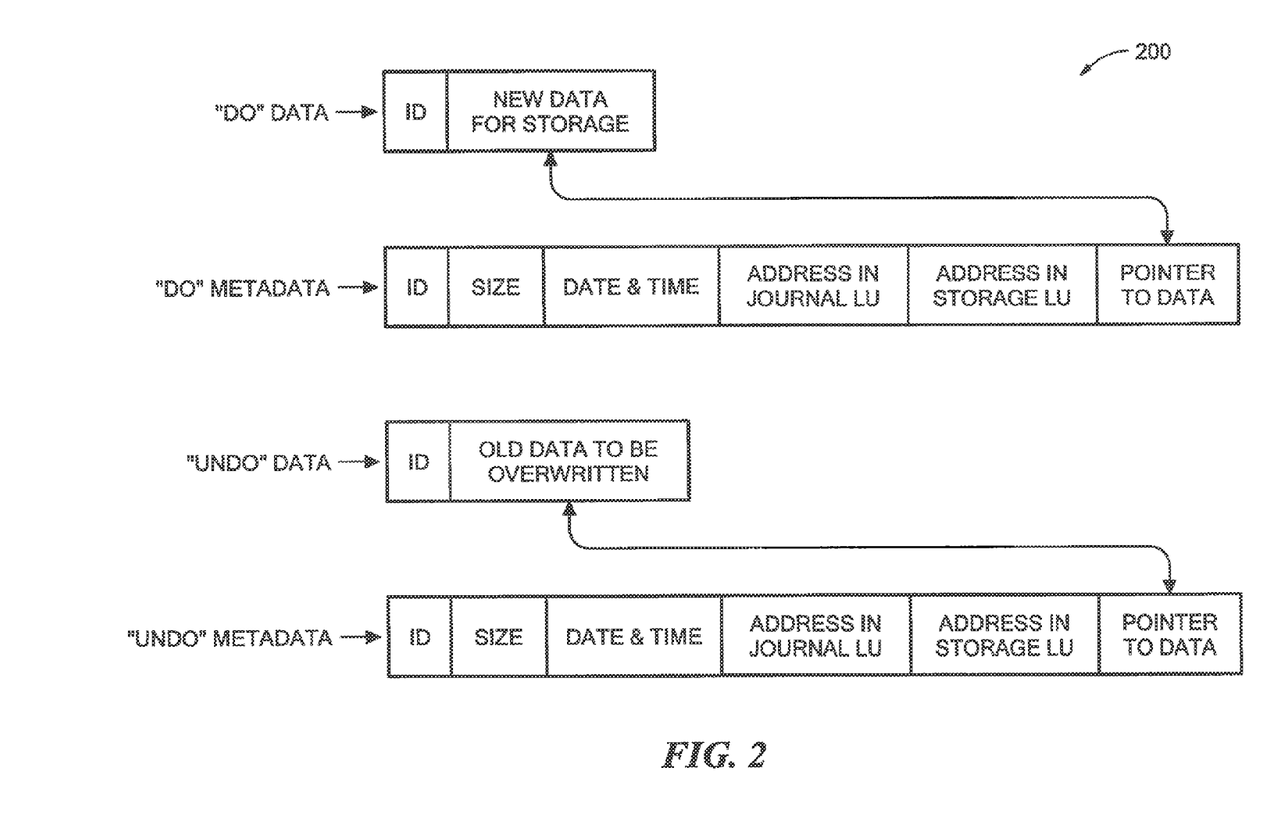
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
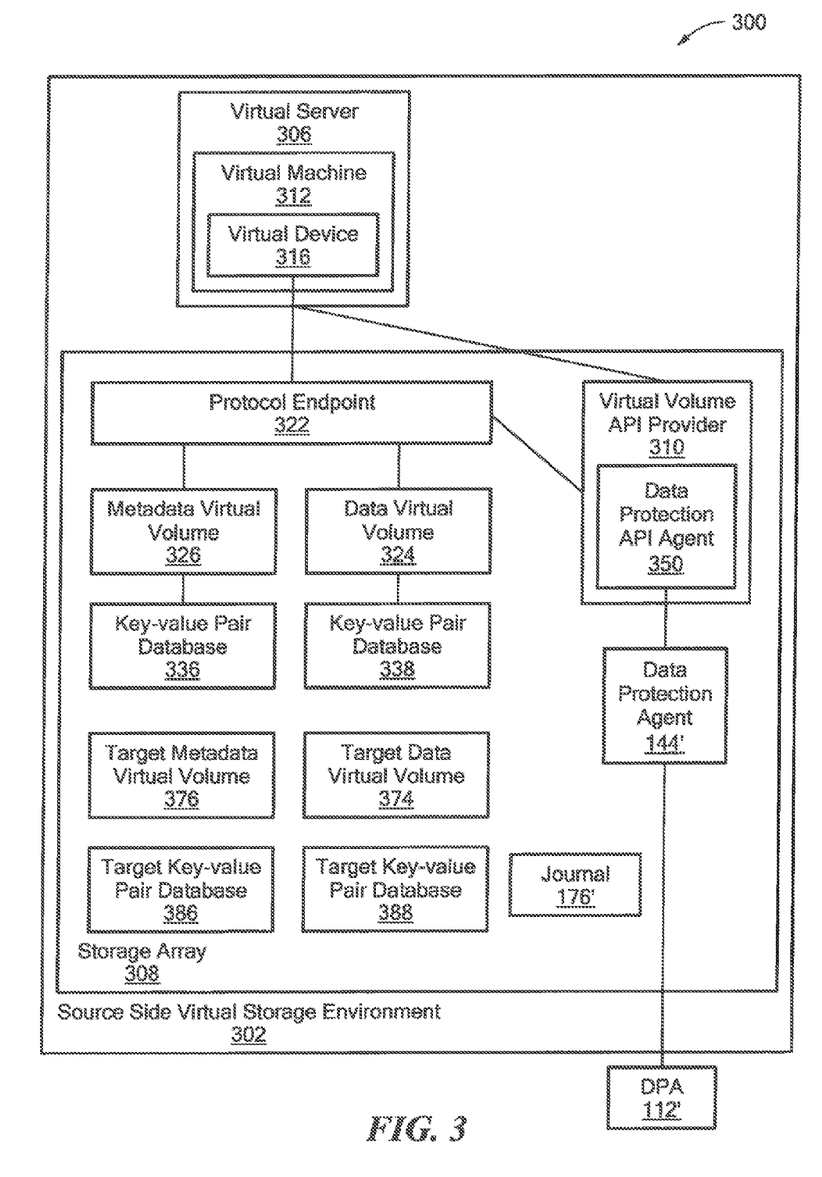
FIG. 3 is a diagram of a virtual storage environment.

Referring to FIG. 3, the data protection system 100 can be modified to a continuous data protection (CDP) 300. For example, the replication site (target side) and the production site (source side) are at the same site. In particular, the source and the target are the same machine. This allows a snapshot to be generated and stored locally. The CDP 300 includes a source-side virtual storage environment 302. In this configuration, the host 104 is removed and replaced by a virtual machine 312. The DPA 112 is replaced with a DPA 112' which may either run as a virtual or physical machine. In one example, the DPA 112' runs either in the virtual machine 312 or as set of processes in a storage array 308. The source side data protection agent 144 is removed from the host 104 and replaced by a data protection agent 144' at the storage array 308. In other examples, the data protection agent 144' is placed at a virtual server 306.

In one example, the source side virtual storage environment 302 includes the virtual server 306 and the storage array 308. The virtual server 306 includes the virtual machine 312, which includes a virtual device 316. In one example, the virtual server 306 is a VMWARE® ESX® server.

The storage array 308 includes the data protection agent 144', a virtual volume API (Application Program Interface) provider 310, a protocol endpoint 322, a data virtual volume 324, a metadata virtual volume 326, and a key-value pair database for each virtual volume (e.g., a key-value pair database 336 for the metadata virtual volume 326 and a key-value pair database 338 for the data virtual volume 324). The data virtual volume 324 stores data associated with one virtual disk or virtual disk derivative (e.g., a snapshot). The storage array also includes a target data virtual volume 374 (a replica of the metadata virtual volume 324), a target metadata virtual volume 376 (a replica of the metadata virtual volume 326), a target key-value pair data base 386 (a replica of the key-value pair data base 336), a target key-value pair data base 388 (a replica of the key-value pair data base 338) and a journal 176' (similar to the journal 176).

The virtual volume API provider 310 provides APIs to allow integration and use of components within the source side virtual storage environment 302. For example it would allow a hypervisor (virtual server 306) to provision storage virtual volumes for virtual machines. The virtual volume API provider 310 may run in other locations than the storage array 308 such as on the virtual server 306 or in a virtual machine, which will be a different machine than virtual machine 312, which is an application machine (e.g., when the data protection agent 144' runs in a hypervisor level). In one example, the virtual volume API provider 310 is a VMWARE® vSphere Storage APIs—Storage Awareness (VASA) provider.

The virtual volume API provider 310 includes a data protection API agent 350. The data protection API agent 350 is used to intercept any commands used to update the key-value pair databases 336, 338. The data protection API agent 350 will notify the data protection agent 144' (splitter) or the DPA 112' on any change occurring to the key-value pair databases 336, 338.

In one example, the virtual volumes 324, 326 may be exposed by a virtualization layer such as a virtual volume filter, and in this case the data protection agent 144' runs in the virtualization layer and the virtual volume API provider 310 may run inside the virtualization layer or in a hypervisor.

In one particular example, the data protection agent 144' runs in the hypervisor kernel, and in this case a second virtual volume API provider layer may run outside the storage array 308 intercepting the API commands and sending them to both data the data protection API agent 350, which will run in the second virtual volume API provider and to first virtual volume API provider 310 running inside storage array 308 (in this case, the data protection agent 350 will not run inside the virtual volume API provider 310 but in the layered second virtual volume provider outside the storage array 308).

The key-value pair databases 336, 338 each include information about their respective virtual volume and other metadata information about their respective virtual volume to allow recovery of the system (e.g., to discover which virtual machines are available) in case of a failure.

Normally, key-value pairs from the key-value pair database are not used in a normal operation; but rather, used to salvage virtual machines from shared storage when the virtual server (e.g., the virtual server 306) databases are corrupted. During recovery, a key-match query operation is performed to rediscover "lost" virtual machines and virtual disks (e.g., the virtual machine 312 with both its metadata virtual volume 326 and data virtual volume 324).

In one example, a key-value pair are well-known keys. In particular, the definition of certain keys (and hence the interpretation of their values) are publicly available. In another example, the key-value pairs are VMWARE®-specific keys. In a further example, the key-value pairs are storage vendor specific keys. In some examples, the key-value pairs are encoded as UTF-8; and a maximum length of a key is 64 bytes and a maximum length of a value is 8 KB.

In one example, each virtual device is associated with one protocol endpoint and one data virtual volume. In one example, the virtual volumes are VMWARE® virtual volumes. In other example, multiple virtual devices may be associated with the same protocol endpoint.

Figure 4:
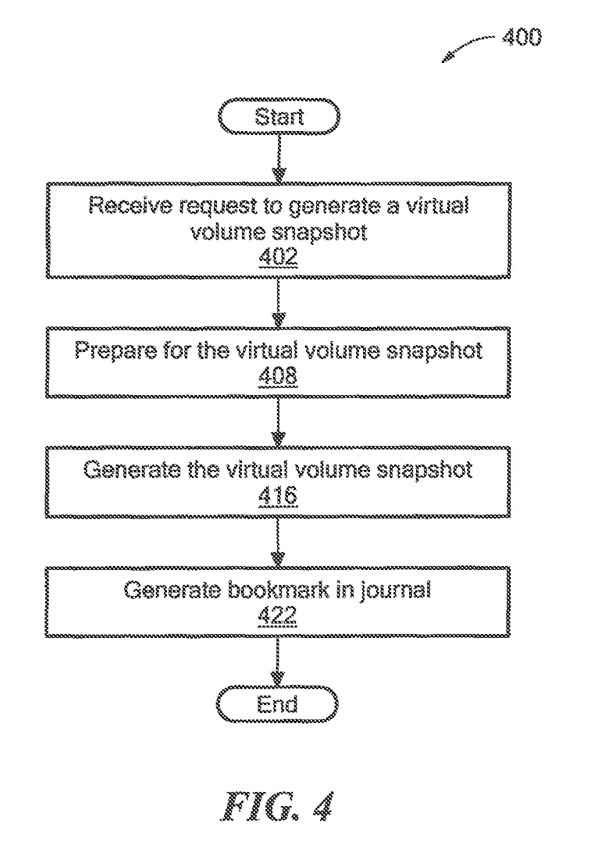
FIG. 4 is a flowchart of an example of a process to generate a virtual volume snapshot.

Referring to FIG. 4, an example of a process to generate a snapshot is a process 400. Process 400 receives a request to generate a snapshot (402). For example, a user using a user interface (e.g., a user interface 708 (FIG. 7)) requests that a virtual volume snapshot be generated.

Process 400 prepares for a virtual volume snapshot (408). For example, an API command is called by the virtual volume API provider 310. Executing the command returns a unique ID of the new virtual volume snapshot to be generated. Executing the command also returns virtual volume information on the virtual volume being snapshot such as key value pair metadata so the virtual server can update it for the snapshot. Executing the command further returns space statistics on the virtual volume that is snapshot. In one example, the command is a VMWARE® command: PrepareToSnapshotVirtualVolume.

Process 400 generates a virtual volume snapshot (416). For example, an API command is called by the virtual volume AP provider 310 to generate the snapshot of the virtual volume and the virtual volume snapshot is generated. In one example, the unique ID is attached to the generated virtual volume snapshot. In one example, the command is a VMWARE® command: SnapshotVirtualVolume.

Process 400 generates a bookmark in the journal. For example, a bookmark is generated in the journal 176' (FIG. 3). In one example, metadata associated with the generated virtual volume snapshot, such as the unique ID, is also kept with the bookmark. At this point no real snapshot of the virtual volume is generated at the storage array 308, just a bookmark.

Figure 5:
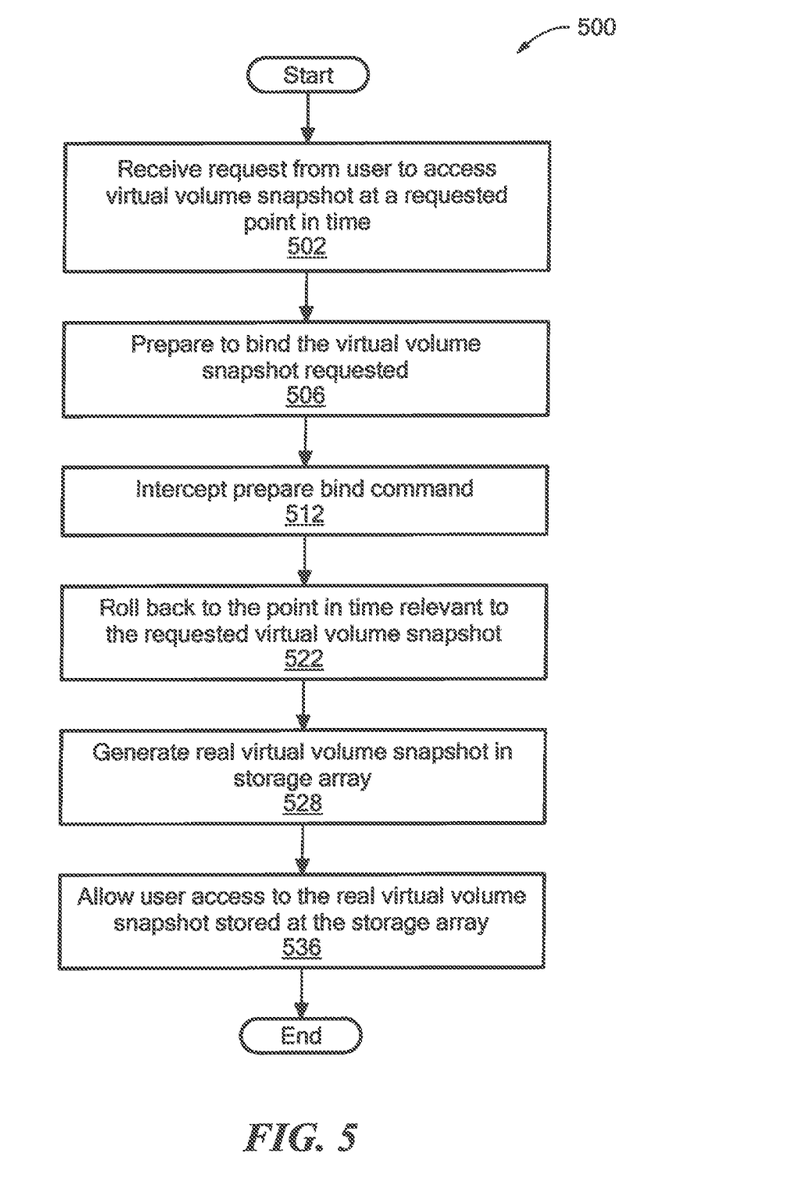
FIG. 5 is a flowchart of an example of a process to access a virtual volume snapshot.

Referring to FIG. 5, an example of a process to access a snapshot is a process 500. Process 500 receives a request from the user to access a virtual volume at a requested point in time (e.g., a request to access a specific snapshot generated by the user) (502). For example, the user using a user interface (e.g., the user interface 708 (FIG. 7)) requests access to a virtual volume snapshot.

Process 500 prepares to bind (i.e., to allow access to) the virtual volume snapshot requested (506). For example, an API command is called by the virtual volume AP provider 310 to bind the virtual volume snapshot. In one example, the command is a VMWARE® command: prepareBindVirtualVolume.

Process 500 intercepts the prepare bind command (512). For example, the data protection API agent 350 intercepts the prepare bind command.

Process 500 rolls back to the point in time relevant to the requested virtual volume snapshot (522). For example, the data protection API agent 350 sends a command to roll back to the relevant bookmark in the journal 176'. Process 500 generates a real virtual volume snapshot in the storage array 308 (528) and allows the user access to the real virtual volume snapshot stored at the storage array 308 (536).

Figure 6:
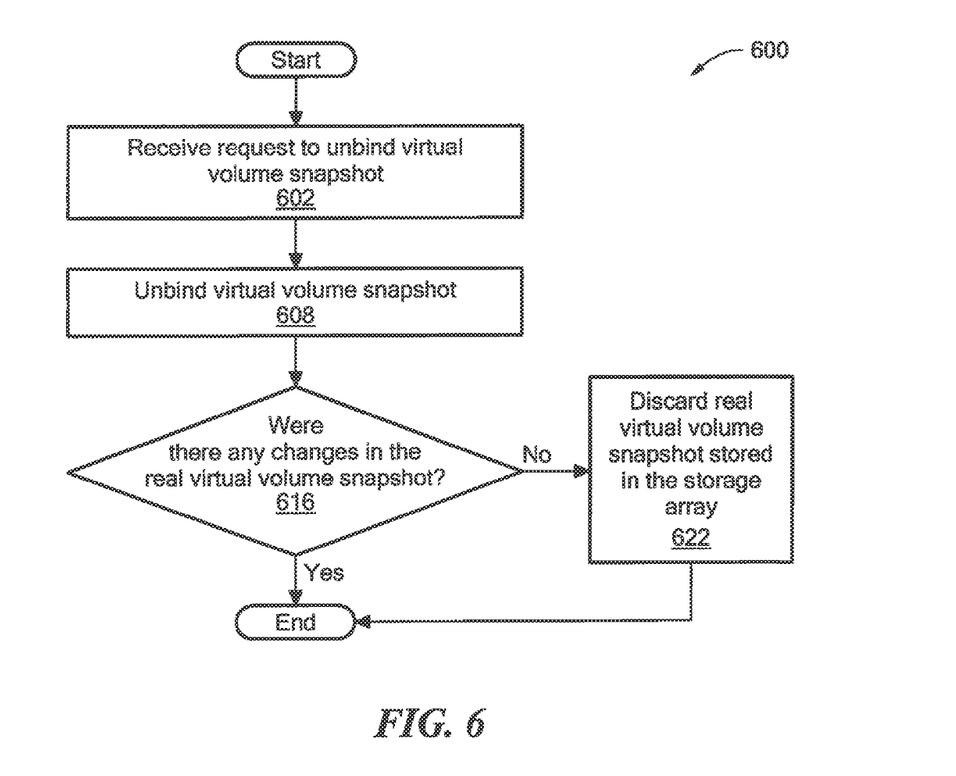
FIG. 6 is a flowchart of an example of a process to unbind a virtual volume snapshot.

Referring to FIG. 6, an example of a process to unbind a virtual volume snapshot is a process 600. Process 600 receives a request from the user to unbind the virtual volume snapshot stored at the storage array 308 (602). For example, the user using a user interface (e.g., the user interface 708 (FIG. 7)) requests to unbind the virtual volume snapshot stored at the storage array.

Process 600 unbinds the virtual volume snapshot (608). For example, an API command is called by the virtual volume AP provider 310 to unbind the virtual volume snapshot. In one example, the command is a VMWARE® command: unbind Virtual Volume.

Process 600 determines if there have been any changes to the real virtual volume snapshot (616). If there have been no changes to the real virtual volume snapshot, process 600 discards the real virtual volume snapshot stored at the storage array 308 (622). If there have been changes to the real virtual volume snapshot, process 600 does nothing and keeps the real virtual volume snapshot on the storage array 308.

In other examples, a user can configure the CDP system 300 to discard virtual volume snapshots after unbinding based on preferences. For example, if a virtual volume snapshot is greater than a predetermined file size, the virtual volume snapshot is discarded after unbinding.

Figure 7:
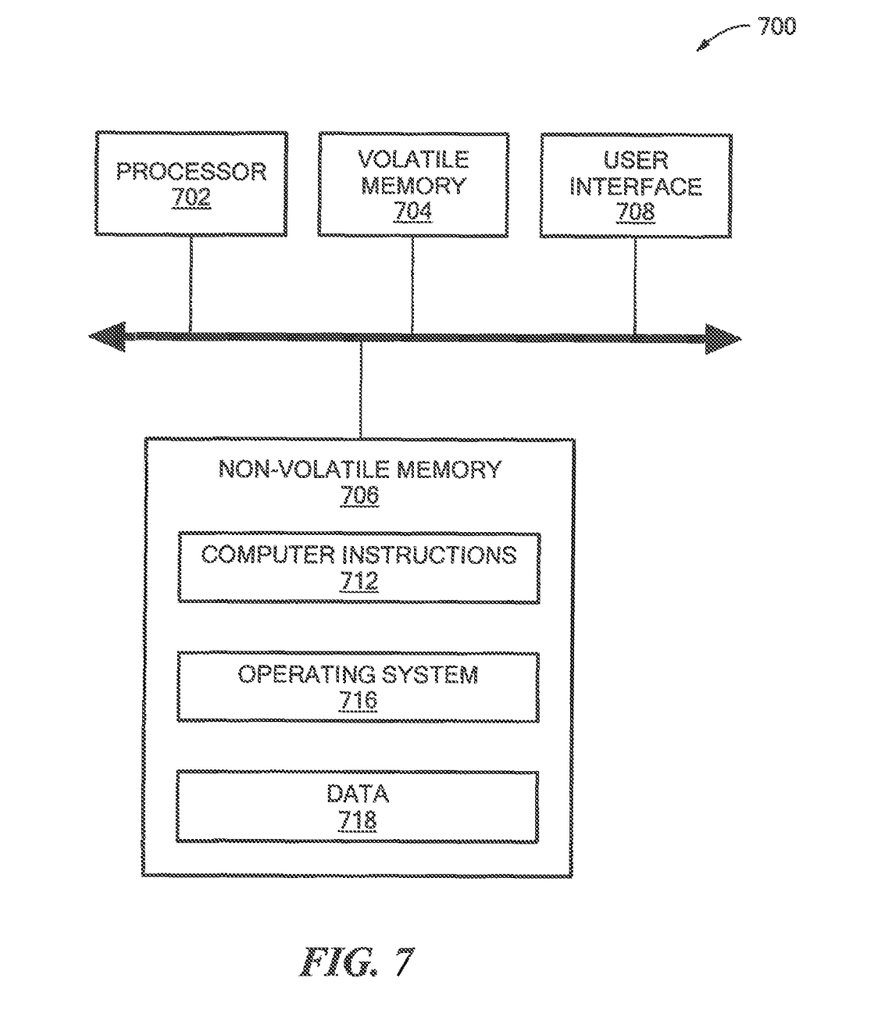
FIG. 7 is a computer on which any of the processes of FIGS. 4 to 6 may be implemented.

Referring to FIG. 7, a computer 700 includes a processor 702, a volatile memory 704, a non-volatile memory 706 (e.g., hard disk) and a user interface (UI) 708 (e.g., a mouse, a keyboard, a display, touch screen and so forth). The non-volatile memory 706 stores computer instructions 712, an operating system 716 and data 718. In one example, the computer instructions 712 are executed by the processor 702 out of volatile memory 704 to perform all or part of the processes described herein (e.g., processes 400, 500, 600).

The processes described herein (e.g., processes 400, 500, 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 400, 500, 600 are not limited to the specific processing order of FIGS. 4 to 6, respectively. Rather, any of the processing blocks of FIGS. 4 to 6 may be re-ordered, combined or removed, performed in parallel or in serial, as necessary, to achieve the results set forth above.

The processing blocks (for example, in the processes 400, 500, 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
   receiving a request to access a snapshot of a virtual volume;
   preparing to bind the snapshot of the virtual volume by a calling a command to prepare bind of the snapshot in response to the request;
   intercepting the command to prepare bind of the snapshot of the virtual volume;
   rolling back to a point in time corresponding to the requested snapshot of the virtual volume in response to intercepting the command to prepare bind the snapshot by undoing write transactions that occurred subsequent to the point in time using a journal comprising:
   a DO stream comprising new data for write transaction in the virtual volume;
   a DO METADATA stream comprising metadata for the writing transactions comprising a pointer to an offset in the DO stream where the data is located in a write transaction;
   an UNDO stream comprises data overwritten in the virtual volume; and
   and UNDO METADATA stream comprising metadata for the data overwritten comprising a pointer to an offset in the UNDO stream where the data overwritten is located; and
   generating a real snapshot of the virtual volume in a storage array to allow access to a user after rolling back to the point in time.

2. The method of claim 1, further comprising:
   receiving a request to generate the snapshot of the virtual volume;
   preparing for the snapshot of the virtual volume;
   generating the snapshot of the virtual volume; and
   generating a bookmark in the journal of a continuous data protection system.

3. The method of claim 2 wherein preparing for the snapshot of the virtual volume comprises generating a unique ID for the snapshot of the virtual volume to be generated; and
   wherein generating the snapshot of the virtual volume comprises attaching the unique ID to the snapshot of the virtual volume.

4. The method of claim 2 wherein generating the snapshot of the virtual volume comprises generating a snapshot of a virtual volume stored on the storage array.

5. The method of claim 1, further comprising:
   receiving a request to unbind the snapshot of the virtual volume;
   unbinding the snapshot of the virtual volume;
   determining if there were any changes to the snapshot of the virtual volume in the storage array; and
   discarding the snapshot of the virtual volume in the storage array if there were no changes to the snapshot of the virtual volume in the storage array.

6. The method of claim 1, further comprising:
   receiving a request to unbind the snapshot of the virtual volume;
   unbinding the snapshot of the virtual volume; and
   discarding the snapshot of the virtual volume after the unbinding based on a user preference.

7. An article comprising:
   a non-transitory machine-readable medium that stores executable instructions, the instructions causing a machine to:
   receive a request to access a snapshot of a virtual volume;
   prepare to bind the snapshot of the virtual volume by a calling a command to prepare bind of the snapshot in response to the request;
   intercept the command to prepare bind of the snapshot of the virtual volume;
   roll back to a point in time corresponding to the requested snapshot of the virtual volume in response to intercepting the command to prepare bind the snapshot by undoing write transactions that occurred subsequent to the point in time using a journal comprising:
   a DO stream comprising new data for write transaction in the virtual volume;
   a DO METADATA stream comprising metadata for the writing transactions comprising a pointer to an offset in the DO stream where the data is located in a write transaction;

an UNDO stream comprises data overwritten in the virtual volume; and
and UNDO METADATA stream comprising metadata for the data overwritten comprising a pointer to an offset in the UNDO stream where the data overwritten is located; and
generate a real snapshot of the virtual volume in a storage array to allow access to a user after rolling back to the point in time.

8. The article of claim 7, further comprising instructions causing the machine to:
receive a request to generate the snapshot of the virtual volume;
prepare for the snapshot of the virtual volume;
generate the snapshot of the virtual volume; and
generate a bookmark in the journal of a continuous data protection system.

9. The article of claim 8 wherein the instructions causing the machine to prepare for the snapshot of the virtual volume comprises instructions causing the machine to generate a unique ID for the snapshot of the virtual volume to be generated; and
wherein the instructions causing the machine to generate the snapshot of the virtual volume comprises instructions causing the machine to attach the unique ID to the snapshot of the virtual volume.

10. The article of claim 8 wherein the instructions causing the machine to generate the snapshot of the virtual volume comprises instructions causing the machine to generate a snapshot of a virtual volume stored on the storage array.

11. The article of claim 7, further comprising instructions causing the machine to:
receive a request to unbind the snapshot of the virtual volume;
unbind the snapshot of the virtual volume;
determine if there were any changes to the snapshot of the virtual volume in the storage array; and
discard the snapshot of the virtual volume in the storage array if there were no changes to the snapshot of the virtual volume in the storage array.

12. The article of claim 7, further comprising instructions causing the machine to:
receive a request to unbind the virtual volume snapshot;
unbind the snapshot of the virtual volume; and
discard the snapshot of the virtual volume after the unbinding based on a user preference.

13. An apparatus, comprising:
circuitry configured to:
receive a request to access a snapshot of a virtual volume;
prepare to bind the snapshot of the virtual volume by a calling a command to prepare bind of the snapshot in response to the request;
intercept the command to prepare bind of the snapshot of the virtual volume;
roll back to a point in time corresponding to the requested snapshot of the virtual volume in response to intercepting the command to prepare bind the snapshot by undoing write transactions that occurred subsequent to the point in time using a journal comprising:
a DO stream comprising new data for write transaction in the virtual volume;
a DO METADATA stream comprising metadata for the writing transactions comprising a pointer to an offset in the DO stream where the data is located in a write transaction;
an UNDO stream comprises data overwritten in the virtual volume; and
and UNDO METADATA stream comprising metadata for the data overwritten comprising a pointer to an offset in the UNDO stream where the data overwritten is located; and
generate a real snapshot of the virtual volume in a storage array to allow access to a user after rolling back to the point in time.

14. The apparatus of claim 13 wherein the circuitry comprises at least one of a processor, a memory, programmable logic and logic gates.

15. The apparatus of claim 13 wherein the circuitry is further configured to:
receive a request to generate the snapshot of the virtual volume;
prepare for the snapshot of the virtual volume;
generate the snapshot of the virtual volume; and
generate a bookmark in the journal of a continuous data protection system.

16. The apparatus of claim 15 wherein the circuitry to prepare for the snapshot of the virtual volume comprises circuitry configured to generate a unique ID for the snapshot of the virtual volume to be generated; and
wherein the circuitry to generate the snapshot of the virtual volume comprises circuitry configured to attach the unique ID to the snapshot of the virtual volume.

17. The apparatus of claim 16 wherein the circuitry to generate the snapshot of the virtual volume comprises circuitry configured to generate a snapshot of a virtual volume stored on the storage array.

18. The apparatus of claim 13 wherein the circuitry is further configured to:
receive a request to unbind the snapshot of the virtual volume;
unbind the snapshot of the virtual volume;
determine if there were any changes to the snapshot of the virtual volume in the storage array; and
discard the virtual volume snapshot in the storage array if there were no changes to the snapshot of the virtual volume in the storage array.

19. The apparatus of claim 13 wherein the circuitry is further configured to:
receive a request to unbind the snapshot of the virtual volume;
unbind the snapshot of the virtual volume; and
discard the snapshot of the virtual volume after the unbinding based on a user preference.

20. The method of claim 1, further comprising:
receiving a request to generate the snapshot of the virtual volume;
preparing for the snapshot of the virtual volume by generating a unique ID for the snapshot of the virtual volume to be generated;
generating the snapshot of the virtual volume by attaching the unique ID to the snapshot of the virtual volume; and
generating a bookmark comprising the unique ID in the journal of a continuous data protection system,
wherein rolling back to the point-in-time corresponding to the requested snapshot of the virtual volume in response to intercepting the command to prepare bind the snapshot comprises rolling back to the bookmark in the journal.

* * * * *